(12) United States Patent
Trehan

(10) Patent No.: US 11,907,665 B2
(45) Date of Patent: *Feb. 20, 2024

(54) METHOD AND SYSTEM FOR PROCESSING USER INPUTS USING NATURAL LANGUAGE PROCESSING

(71) Applicant: Rajiv Trehan, Bangkok (TH)

(72) Inventor: Rajiv Trehan, Bangkok (TH)

(73) Assignee: RAJIV TREHAN, Bangkok (TH)

( * ) Notice: Subject to any disclaimer, the term of this patent is extended or adjusted under 35 U.S.C. 154(b) by 207 days.

This patent is subject to a terminal disclaimer.

(21) Appl. No.: 17/317,047

(22) Filed: May 11, 2021

(65) Prior Publication Data

US 2021/0350073 A1   Nov. 11, 2021

Related U.S. Application Data

(60) Provisional application No. 63/023,171, filed on May 11, 2020.

(51) Int. Cl.

| | |
|---|---|
| *G06F 40/30* | (2020.01) |
| *G06F 16/9032* | (2019.01) |
| *G06F 16/9035* | (2019.01) |
| *G06F 18/214* | (2023.01) |
| *G06F 40/20* | (2020.01) |

(52) U.S. Cl.
CPC ........ *G06F 40/30* (2020.01); *G06F 16/9035* (2019.01); *G06F 16/90332* (2019.01); *G06F 18/214* (2023.01); *G06F 40/20* (2020.01)

(58) Field of Classification Search
CPC ............... G06F 40/30; G06F 16/90332; G06F 16/9035; G06F 40/20; G06F 18/214
See application file for complete search history.

(56) References Cited

U.S. PATENT DOCUMENTS

| | | | | |
|---|---|---|---|---|
| 2012/0265528 A1* | 10/2012 | Gruber | ............... | G10L 15/183 704/235 |
| 2019/0213284 A1* | 7/2019 | Anand | ............... | G06F 40/35 |
| 2020/0327284 A1* | 10/2020 | Sapugay | ............... | G06N 3/006 |
| 2020/0380963 A1* | 12/2020 | Chappidi | ............... | G10L 15/063 |
| 2020/0410989 A1* | 12/2020 | Ray | ............... | G06N 20/00 |
| 2021/0065709 A1* | 3/2021 | Duong | ............... | G10L 15/22 |
| 2021/0090570 A1* | 3/2021 | Aharoni | ............... | H04M 1/02 |

FOREIGN PATENT DOCUMENTS

EP   3557504 A1 * 10/2019   ........... G06F 16/243

* cited by examiner

*Primary Examiner* — Sonia L Gay

(57) ABSTRACT

The disclosure relates to system and method for processing user input using Natural Language Processing (NLP). The method includes generating, by an NLP model, a set of input intent maps associated with a user input. The method includes matching each of the set of input intent maps with each of a plurality of pre-stored sets of intent maps. Each of the plurality of pre-stored sets of intent maps is generated from a single predefined training input and is mapped to a predefined intent and a predetermined response. The method includes determining a distance of each of the set of input intent maps relative to each of the plurality of pre-stored sets of intent maps. Further, the method includes identifying a pre-stored intent map closest to the set of input intent maps and rendering the predetermined response mapped to the pre-stored sets of intent maps to the user.

19 Claims, 10 Drawing Sheets

Match each of the set of input intent maps 304

| Hard Level Match 402 | Soft Level Match 404 | Plural Level Match 406 | Tense Level Match 408 |

METHOD AND SYSTEM FOR PROCESSING USER INPUTS USING NATURAL LANGUAGE PROCESSING

CROSS-REFERENCE TO RELATED APPLICATION

This application claims priority benefits under 35 U.S.C. § 119(e) to U.S. Provisional Application No. 63/023,171 filed on May 11, 2020, which is hereby incorporated by reference in its entirety.

TECHNICAL FIELD

This disclosure relates generally to gathering information from user inputs and subsequently processing it, and more particularly to system and method for processing the user inputs using Natural Language Processing (NLP).

BACKGROUND

In today's technology-driven society, users and businesses increasingly rely on computing systems to facilitate and provide various types of services. As dependency on computing systems is increasing significantly, so is the requirement for high quality Artificial Intelligence (AI) systems and methods and Natural Language Processing (NLP) techniques to ensure that computing systems interact effectively and more naturally with the users. AI approach of Machine Learning (ML) is one of a leading approach for understanding requests and intents from a user input. The AI approach maintains a corpus of known examples which are labelled and tagged with intents for performing intent classification and are then used to train a neural network. The trained neural network provides a high-quality correlation of the user input to intents and may be relied for having enough training examples. However, this approach does not work well if the user input (e.g., poorly structured or poorly-worded texts) do not follow the same patterns as in maintained labelled and tagged intent based training examples.

Linguistic processing is another approach for understanding the user input. In linguistic processing, parts of the user input, such as, nouns, verbs, adverbs, tense are extracted and associated through grammatical and syntactical processing. This approach requires a grammar and a parser which encompasses varying language cases. However, this approach does not work well if the text (e.g., poorly structured or poorly-worded texts) present in the user input being parsed does not pass effectively through the grammatical and syntactical processing. Additionally, this approach does not work well for inputs of varying languages and dialects.

With developments in NLP techniques, computing systems are now capable of reading text, processing speech, interpreting text and speech, determining sentiments, intents and purposes within text and speech, and relationships between words of a speech. The NLP techniques may be used to parse text, perform part-of-speech tagging on the parsed text, identify languages associated with the text and identify intent, purpose, request from the parsed text. Further, the NLP techniques may translate text provided in one language to another language. In addition, the NLP techniques may perform Speech-to-Text (STT) or Text-to-Speech (TTS) conversions. The NLP techniques may extract contextual information, analyze sentiments, determine intents, purposes, topics, and subject matters from the user input. However, existing NLP techniques do not work well for poorly-structured and poorly-worded texts, since representative training sets of poor worded texts are limited and classical language processing that breaks down the poor worded texts as text fragments do not follow expected structures, examples and rules.

An additional ML approach is based on learning by examples, i.e., training data. Higher the number of training data collected, the better trained the neural network becomes. The training data is tagged into sets and a new case is added into the network by tagging using existing tags. However, this approach of tagging is not broad and biases both over fit and under fit in the training data.

Prevalent approaches allow a user to issue voice commands and to interact with services provided by a virtual assistant. These services have access to a lot of training data samples which are appropriately tagged with intents. The training data may be maintained in various languages along with their appropriate synonyms. However, in case of a failure, it is challenging to determine at which step the ML process of the virtual assistant failed. The reasons for failure may include limited or biased training data, incomplete or inaccurate tagging and incapability of a ML learning algorithm to capture patterns and correct classifications in the user input. Additionally, when an intent from the user input is determined incorrectly by these approaches, it is hard to resolve a mis-match between the user's intent and the NLP's derived intent.

Therefore, there is a need in the art for improved methods and systems for processing the user input using an NLP model thereby accurately identifying intents, purpose, request and sentence parts from the user input.

SUMMARY

In an embodiment, a method for processing user input using Natural Language Processing (NLP) is disclosed. In one example, the method may use an NLP model for generating a set of input intent maps associated with a user input received from a user based on a first subset of words extracted from the user input. Generating the set of input intent maps may comprise processing the first subset of words through at least one of a plurality of intent map transforming algorithms. The set of input intent maps may be one of a set of partial input intent maps and a set of complete input intent maps. The method may match each of the set of input intent maps with each of a plurality of pre-stored sets of intent maps. Each of the plurality of pre-stored sets of intent maps may be generated from a single predefined training input and may be mapped to a predefined intent and a predefined response. The single predefined training input may comprise a predefined input command. Further, the method may determine a distance of each of the set of input intent maps relative to each of the plurality of pre-stored sets of intent maps. The method may identify a pre-stored intent map from the plurality of pre-stored sets of intent maps closest to the set of input intent maps. Further, the method may render the predetermined response mapped to the pre-stored sets of intent maps to the user.

In another embodiment, a system for processing user input using NLP is disclosed. In one example, the system may include a processor, and a memory communicatively coupled to the processor. The memory comprises processor instructions, which when executed by the processor causes the processor to use an NLP model to generate a set of input intent maps associated with a user input received from a user based on a first subset of words extracted from the user input. Generating the set of input intent maps may comprise processing the first subset of words through at least one of a plurality of intent map transforming algorithms. The set of input intent maps may be one of a set of partial input intent maps and a set of complete input intent maps. The processor instructions may match each of the set of input intent maps with each of a plurality of pre-stored sets of intent maps. Each of the plurality of pre-stored sets of intent maps may be generated from a single predefined training input and may be mapped to a predefined intent and a predetermined response. The single predefined training input may comprise a predefined input command. Further, the processor instructions, may determine a distance of each of the set of input intent maps relative to each of the plurality of pre-stored sets of intent maps. The processor instructions may identify a pre-stored intent map from the plurality of pre-stored sets of intent maps closest to the set of input intent maps. Further, the processor instructions, may render the predetermined response mapped to the pre-stored sets of intent maps to the user.

In yet another embodiment, a computer program product for processing user input using NLP, is disclosed. In one example, the computer program product is embodied in a non-transitory computer readable storage medium and comprises computer instructions for generating a set of input intent maps associated with a user input received from a user based on a first subset of words extracted from the user input. Generating the set of input intent maps may comprise processing the first subset of words through at least one of a plurality of intent map transforming algorithms. The set of input intent maps may be one of a set of partial input intent maps and a set of complete input intent maps. The computer instructions may match each of the set of input intent maps with each of a plurality of pre-stored sets of intent maps. Each of the plurality of pre-stored sets of intent maps may be generated from a single predefined training input and may be mapped to a predefined intent and a predetermined response. The single predefined training input may comprise a predefined input command. Further, the computer instructions may determine a distance of each of the set of input intent maps relative to each of the plurality of pre-stored sets of intent maps. The computer instructions may identify a pre-stored intent map from the plurality of pre-stored sets of intent maps closest to the set of input intent maps. Further, the computer instructions may render the predetermined response mapped to the pre-stored sets of intent maps to the user.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 4 illustrates an exemplary process for matching each of a set of input intent maps with each of a plurality of pre-stored sets of intent maps, in accordance with some embodiments.

FIG. 9A illustrates an example scenario depicting tracing of steps leading to a failure to identify a relevant pre-stored intent map from a plurality of pre-stored sets of intent maps, in accordance with an exemplary embodiment.

FIG. 9B illustrates an example scenario depicting tracing of steps leading to a success in identifying a relevant pre-stored intent map from the plurality of pre-stored sets of intent maps, in accordance with an exemplary embodiment.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
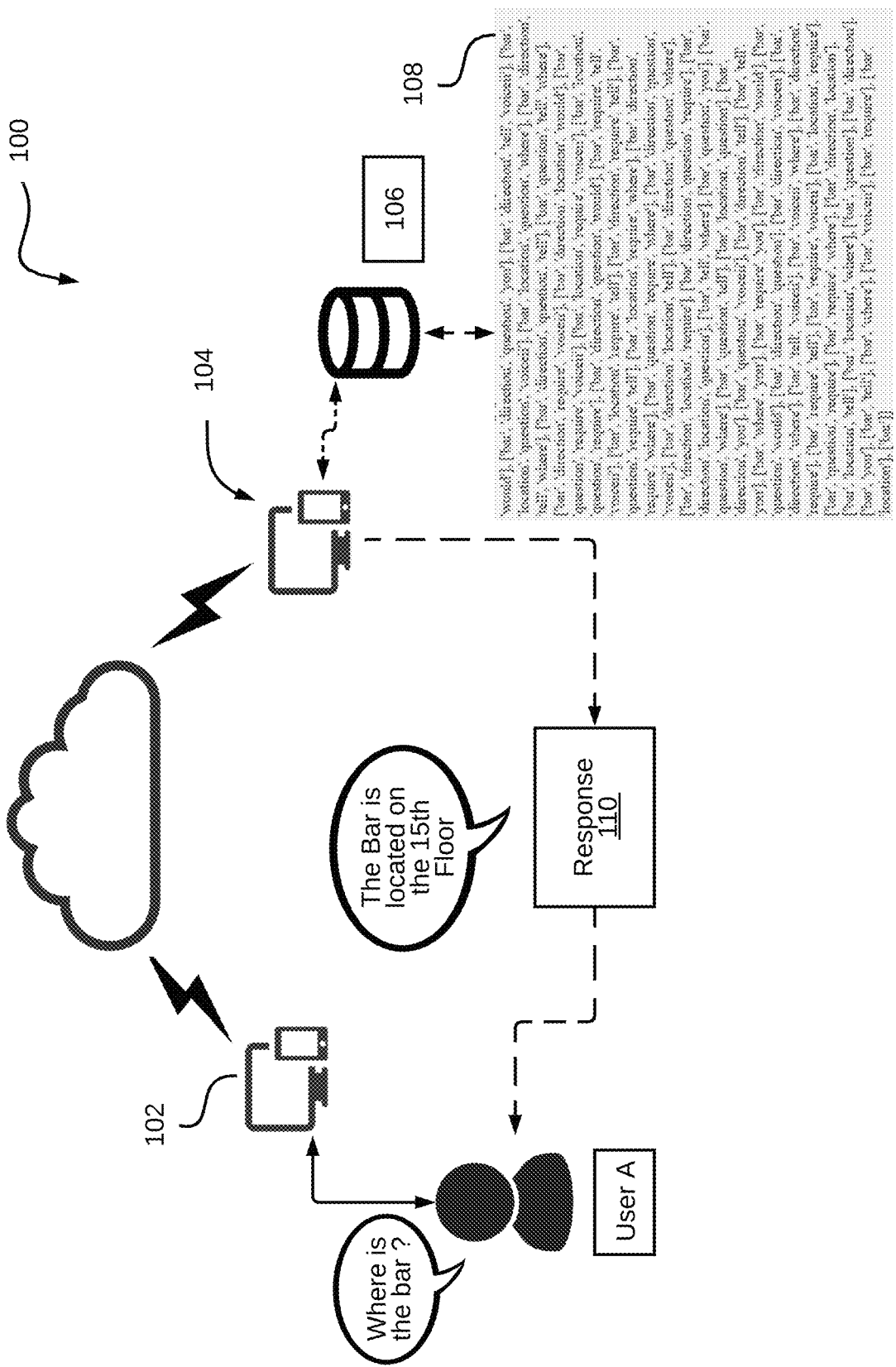
FIG. 1 illustrates an exemplary system for processing user input using Natural Language Processing (NLP), in accordance with some embodiments.

Referring now to FIG. 1, an exemplary system 100 for processing user inputs using Natural Language Processing (NLP) is illustrated, in accordance with some embodiments. By way of an example, the system 100 may have a user A that may generate a user input. The user input may include one or more of, but is not limited to a query, a command, a request, an action and the like. By way of an example, the user may be in a hotel and may be looking for a bar. To this end, the user may ask a question "where is the bar?" to an automated bot. The user input may be provided via a computing device 102 (which, for example, may include, but is not limited to a mobile phone, a laptop, a desktop, or a Personal Digital Assistants (PDA), an application server, and so forth).

The computing device 102 may be connected to a communication network (for example, a wired network, a wireless network, the internet, and the like). The computing device 102 may be communicatively coupled to a computing device 104 via the communication network and may receive the user input. The computing device 104 may receive the user input. Examples of the computing device 104, may include, but are not limited to a mobile phone, a laptop, a desktop, or a PDA, an application server, and so forth. The computing device 104 may use an NLP model to generate a set of input intent maps. Examples of the NLP model may include, but are not limited to Bidirectional Encoder Representations from Transformers (BERT), Robustly Optimized BERT Pretraining Approach (RoBERTa), ALBERT XLNet, and the like). Further, one or more of a morphological level of linguistic processing, a lexical level analysis, a semantic level analysis may be performed on the user input using the NLP model to generate the set of input intent maps. The set of input intent maps may be, for example, a network of words, a network of concepts, a set of related words, fragments of a sentence, a set of sentences of a known domain and the like. In an embodiment, the set of input intent maps may also include one or more forms of verb, desire, question, location, and noun. The set of input intent maps, for example, may be represented or stored as a set of lexeme graphs, a time interval, number of days, a counter, a set of anaphoric references, compound concepts and the like. The generated set of input intent maps may be associated with the user input received from the user A. Further, the set of input intent maps may be generated based on a first subset of words extracted from the user input.

Referring back to the above-mentioned example, for the user input "Where is the bar?", the generated set of input intent maps, for example, may be represented as given below:

["bar","where"], ["question","bar","location"], ["direction","bar"], ["question","bar"], ["question","bar","direction"], ['bar', 'location', 'question'], ['bar', 'direction', 'question'], ['bar', 'where'], ['bar', 'direction'], ['bar', 'question'], ['where': 'VB', 'is': 'VBZ', 'Bar': 'NN', 'the' 'DT']

It will be apparent that each set of words within the "[ ]" represents a type of intent map. As discussed before, the set of input intent maps may include, but are not limited to a desire, an intent, a question, a location information, a noun, a verb, and similar additional information as determined from the user input. In an embodiment, the generation of the set of input intent maps may include processing of the first subset of words through at least one of a plurality of intent map transforming algorithms. The intent map transforming algorithms may include at least one of a refinement mechanism, a consolidation mechanism, a synonym mechanism, and a reduction mechanism.

Once the set of input intent maps have been generated, each of the set of input intent maps may be matched with each of a plurality of pre-stored sets of intent maps maintained in a database 106. One of the plurality of pre-stored sets of intent maps, for example, may be represented as:

["bar","location","question"], ["bar","direction","question"], ["bar","location","question"], ["bar","where"], ["bar","direction"], ["bar-direction"]

A more exhaustive example of pre-stored sets of intent maps is depicted as a set of pre-stored intent maps 108. Each of the plurality of pre-stored sets of intent maps may be generated from a single predefined training input. The single predefined training input may include a predefined input command. In continuation of the example given above, the predefined input command or the single predefined training input may be "where is the bar located." The set of pre-stored intent maps 108 may be generated based on the single training input, i.e., "where is the bar located." As a result, unlike, conventional AI or neural network based methods, where a huge number of sample queries (in some cases thousands or more) may be required to train the conventional AI or neural network based methods, the disclosed embodiments require only a single training input. Each of the plurality of pre-stored sets of intent maps may be generated from the single predefined training input based on an iterative and elastic stretching process, such that, each of the plurality of pre-stored sets of intent maps may be gradually manipulated and stretched using at least one of the plurality of intent map transforming algorithms discussed above.

Each of the plurality of pre-stored sets of intent maps is further mapped to a predefined intent and a predetermined response. As may be appreciated, the predetermined response may include, for example, canned text, predefined templates, and AI generated responses based on the user's intent and context. In continuation of the example above, each of the set of pre-stored intent maps 108 may be mapped to the intent "location:bar" and the predetermined response of "Bar is located on the 15$^{th}$ floor."

In response to matching each of the set of input intent maps with each of a plurality of pre-stored sets of intent maps, a distance of each of the set of input intent maps relative to each of the plurality of pre-stored sets of intent maps may be determined. The distance may correspond to how close each of the set of input intent maps is relative to each of the plurality of pre-stored sets of intent maps. The distance may be computed between vector representations of each of the set of input intent maps and vector representations of each of the plurality of pre-stored sets of intent maps. In this case, the distance, for example, may be a Euclidean distance. In addition, the distance may be based on a generation procedure, and a level of complexity of the set of input intent maps.

Subsequently, a pre-stored intent map closest (i.e., with a least distance) to the set of input intent maps may be identified from the plurality of pre-stored sets of intent maps. Upon determination of the closest pre-stored intent map, the predetermined response 110 mapped to the closest pre-stored set of intent map may be rendered to the user. In continuation of the example given above, the pre-stored intent map identified from within the set of pre-stored intent maps 108 as being closest to the set of input intent maps generated for the user query "where is the bar?" may be: ["bar","location","question"]. Additionally, as the predetermined response 110, i.e., "Bar is located on the 15th floor," is mapped to the pre-stored intent map, i.e., ["bar","location","question"], this predetermined response is rendered to the user A. In an embodiment, the set of input intent maps may be processed by an Application Programming Interface (API) corresponding to, but not limited to weather, flight, banking information, and so forth. In such cases the predetermined response may be fetched from the API, and may be related but not limited to, for example, providing a service, performing an action, and generating a real time response.

As may be appreciated, use of at least one of the plurality of intent map transforming algorithms may enable identifying and providing a closest pre-stored intent map while applying a minimum number of transformations to the first subset of words to find a match. This implies that the closest pre-stored intent may be determined by performing a minimum number of transformations involving, for example, stretching and simplifications during the elastic stretching process. In addition, the set of input intent maps and the plurality of pre-stored sets of intent maps may be ordered and maintained such that the search for the closest pre-stored intent map involves performing minimal number of transformations thereby extracting relevant content. Further, based on a context dimension, the set of input intent maps and the plurality of pre-stored sets of intent maps may be ordered and maintained such that the search for the closest pre-stored intent map involves performing minimal number of transformations by the elastic stretching process. In an embodiment, the intent map transforming algorithms may be domain specific and may thus further improve accuracy of match between the set of input intent maps and the plurality of pre-stored sets of intent maps. Additionally or alternatively, the generated set of input intent maps may be directed to knowledge sources for resolution.

In an embodiment, the user input may be a textual input and/or a verbal input. In an embodiment, the mode to render the response may vary based on the mode of the user input. For example, if the user input is in the form of text, then the response would also be in the form of text. In another embodiment, the user may predefine the mode that may be used to render the response, irrespective of the mode in which the user input is received. For example, irrespective of whether the user input is in the form of text or voice, the response would also be vocal.

In case, the user input is verbal, the verbal input may be converted to a plurality of textual outputs using a Speech-to-Text (STT) mechanism. As may be appreciated, the plurality of textual outputs may be such as a sentence, a set of words, or multiple words. In such case, a set of input intent maps may be generated for each of the plurality of textual outputs. Further, a confidence score may also be associated with each of the plurality of textual outputs. The confidence score may correspond to an accuracy or confidence of the conversion of the verbal input into the associated textual output and is based on a predetermined STT training set. As may be appreciated, one or more of textual outputs having a higher confidence score may replace textual outputs with lesser confidence scores. Basis this replacement, the set of input intent maps may be generated for the textual outputs having a higher confidence score and may be compared with each of the plurality of pre-stored sets of intent maps.

Figure 2:
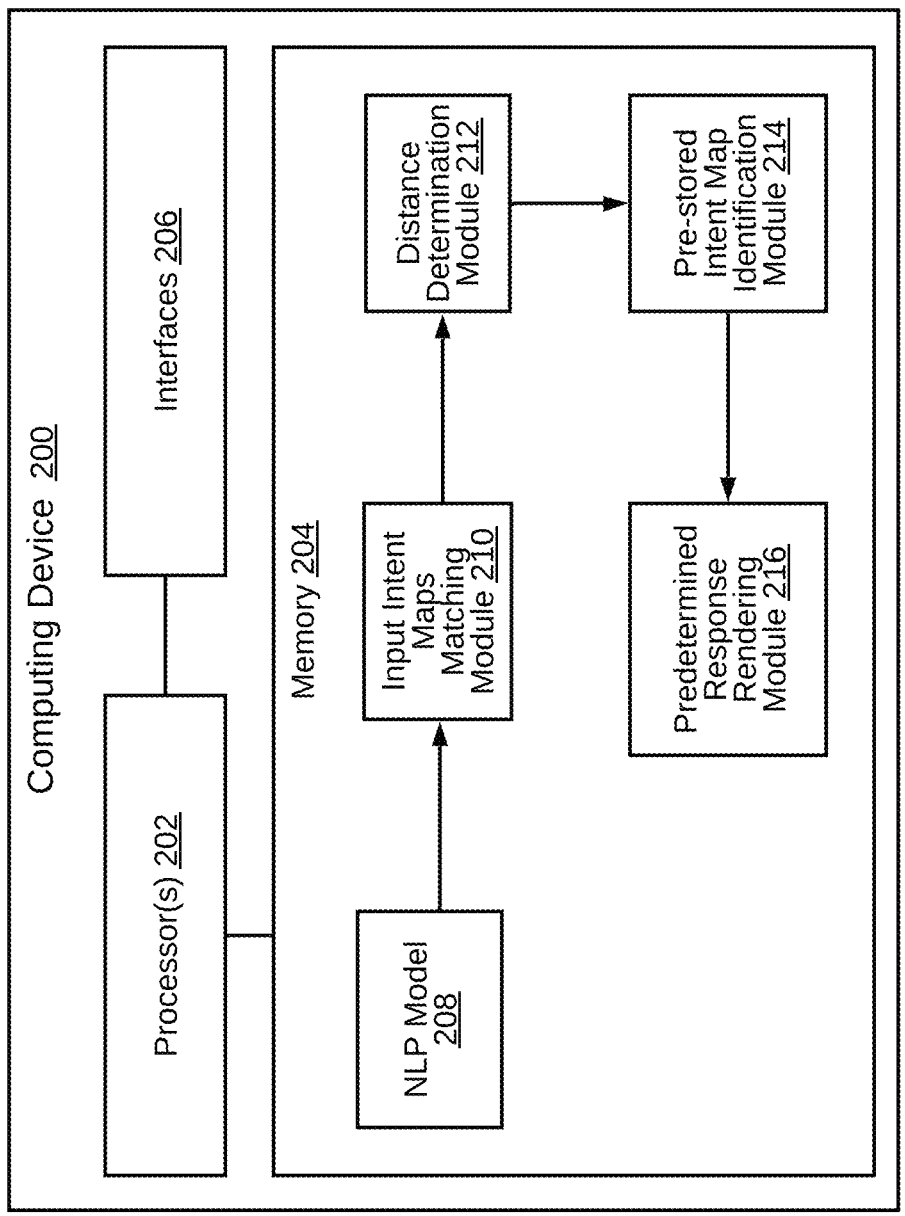
FIG. 2 illustrates a functional block diagram of a computing device implementing an NPL model for processing user inputs, in accordance with some embodiments.

Referring now to FIG. 2, a functional block diagram of a computing device 200 implementing an NPL model for processing user inputs is illustrated, in accordance with some embodiments. The computing device 200 may include one or more processors 202, a memory 204, and one or more interfaces 206. The memory 204 may include an NLP model 208, an input intent maps matching module 210, a distance determination module 212, a pre-stored intent map identification module 214, and a predetermined response rendering module 216.

The one or more processors 202 may be implemented as one or more microprocessors, microcomputers, microcontrollers, digital signal processors, central processing units, logic circuitries, and/or any devices that manipulate data based on operational instructions. Among other capabilities, the one or more processors 202 may be configured to fetch and execute processor-executable instructions stored in the memory 204. The memory 204 may store one or more processor-executable instructions or routines, which may be fetched and executed for processing user input using NLP. The memory 204 may include any non-transitory storage device including, for example, volatile memory such as RAM, or non-volatile memory such as EPROM, flash memory, and the like. The one or more interfaces 206 may include a variety of interfaces, for example, interfaces for data input and output devices, referred to as I/O devices, storage devices, and the like.

In an embodiment, the NLP model 208 may generate a set of input intent maps based on a first subset of words extracted from a user input received from a user. The generation of the set of input intent maps may include processing the first subset of words through at least one of a plurality of intent map transforming algorithms. The set of input intent maps may be one of a set of partial input intent maps and a set of complete input intent maps. When the set of input intent maps is the set of partial input intent maps, the set of input intent maps may be generated by iteratively processing the first subset of words through each of the plurality of intent map transforming algorithms. The first subset of words may be iteratively processed in at least a sequential manner or a parallel manner to generate the set of partial input intent maps. This is further explained in detail in conjunction with FIG. 7. In an embodiment, the set of input intent maps may be a node network that includes a plurality of nodes. Further, each of the plurality of nodes may be a vector representation of one of the first subset of words extracted from the user input. By way of an example, the set of input intent maps may be represented or stored as lexeme graphs, a time interval, number of days, a counter, a set of anaphoric references, compound concepts, and the like.

The input intent maps matching module 210 may then match each of the set of input intent maps with each of a plurality of pre-stored sets of intent maps. The matching may be exhaustively performed to find a pre-stored intent map from the plurality of pre-stored sets of intent maps that is closest to the set of input intent maps. Further, the matching comprises identifying the pre-stored intent map while traversing a minimum distance amongst the plurality of pre-stored sets of intent maps. Each of the plurality of pre-stored sets of intent maps may be generated from a single predefined training input and may be mapped to a predefined intent and a predetermined response. The single predefined training input may include a predefined input command. In an embodiment, matching of each of the set of input intent maps further includes performing one or more of a hard level match, a soft level match, a plural level match, and a tense level match. This is further explained in detail in conjunction with FIG. 4.

In an embodiment, for a dialogue-based conversation, matching of the set of input intent maps and subsequent rendering of the predetermined response mapped to the pre-stored sets of intent maps may be performed iteratively. In the dialogue-based conversation, each of the plurality of pre-stored sets of intent maps may be generated from a single predetermined training dialogue and may be mapped to a predetermined response template. The predetermined response template may be populated before being rendered based on the set of input intent maps and a current context associated with the user and the dialogue-based conversation. This is further explained in detail in conjunction with FIG. 6.

In an embodiment, the input intent maps matching module 210 may also identify a context dimension associated with the user and a corresponding state of the user) and may then apply the context dimension to the set of input intent maps to generate a modified set of input intent maps. The content dimension, for example, may be based on demographic details of the user, current location of the user, current temperature of the location where the user is present, current transportation being used by the user, time of the day, day of the week, or the current month. The input intent maps matching module 210 may also apply the context dimension to the plurality of pre-stored sets of intent maps to filter a subset of pre-stored sets of intent maps. Based on the context dimension, the subset of pre-stored sets of intent maps may be sorted in a descending order of relevance. Further, the modified set of input intent maps may be matched with each of the subset of pre-stored sets of intent maps. The embodiment related to the context dimension is further explained in detail in conjunction with FIG. 5.

Thereafter, the distance determination module 212 may determine a distance of each of the set of input intent maps relative to each of the plurality of pre-stored sets of intent maps. In other words, upon performing the matching, a determination of a level (i.e. distance traversed for finding a match) of match of each of the set of input intent maps may be done relative to each of the plurality of pre-stored set of intent maps. In case the context dimension is identified and applied, the distance determination module 212 may determine a distance of each of the modified set of input intent maps relative to each of the subset of pre-stored sets of intent maps may be determined.

Based on the distance determined, the pre-stored intent map identification module 214 may identify a pre-stored intent map from the plurality of pre-stored sets of intent maps that is closest to the set of input intent maps. In other words, based on the shortest determined distance or the highest determined level of match, the pre-stored intent map may be identified. In case the context dimension is identified and subsequently applied, the pre-stored intent map identification module 214 may identify a pre-stored intent map closest to the modified set of input intent maps from the subset of pre-stored sets of intent maps.

Once the pre-stored intent map is identified, the predetermined response rendering module 216 may render the predetermined response mapped to the pre-stored intent map. The rendering may include presenting the predetermined response to the user in form of text or speech. The predetermined response may also be presented in form of an intent map. The rendering module 216 may be implemented as an assistant having, for example, a male voice or a female voice.

It should be noted that all such aforementioned modules 208-216 may be represented as a single module or a combination of different modules. Further, as will be appreciated by those skilled in the art, each of the modules 208-216 may reside, in whole or in parts, on one device or multiple devices in communication with each other. In some embodiments, each of the modules 208-216 may be implemented as dedicated hardware circuit comprising custom application-specific integrated circuit (ASIC) or gate arrays, off-the-shelf semiconductors such as logic chips, transistors, or other discrete components. Each of the modules 208-216 may also be implemented in a programmable hardware device such as a field programmable gate array (FPGA), programmable array logic, programmable logic device, and so forth. Alternatively, each of the modules 208-216 may be implemented in software for execution by various types of processors (e.g., processor(s) 202). An identified module of executable code may, for instance, include one or more physical or logical blocks of computer instructions, which may, for instance, be organized as an object, procedure, function, or other construct. Nevertheless, the executables of an identified module or component need not be physically located together but may include disparate instructions stored in different locations which, when joined logically together, include the module, and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for identifying common requirements from applications. For example, the exemplary computing device 200 may identify common requirements from applications by the processes discussed herein. In particular, as will be appreciated by those of ordinary skill in the art, control logic and/or automated routines for performing the techniques and steps described herein may be implemented by the computing device 200 either by hardware, software, or combinations of hardware and software. For example, suitable code may be accessed and executed by the one or more processors on the computing device 200 to perform some or all of the techniques described herein. Similarly, ASICs configured to perform some or all of the processes described herein may be included in the one or more processors on the computing device 200.

Figure 3:
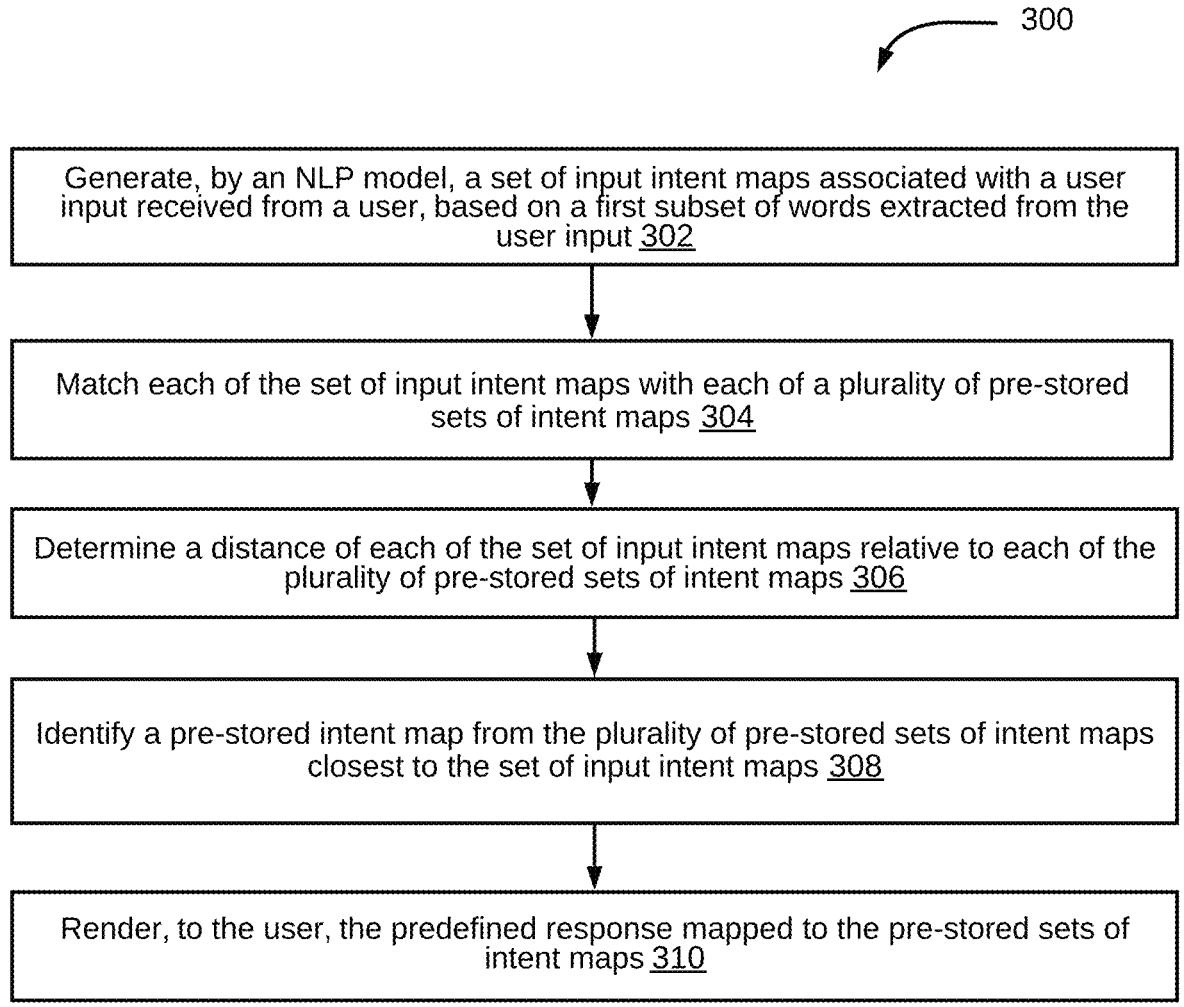
FIG. 3 illustrates an exemplary process for processing user input using NLP, in accordance with some embodiments.

Referring now to FIG. 3, an exemplary process 300 for processing user input using NLP is depicted via a flowchart, in accordance with some embodiments. The process 300 includes using an NLP model, to generate a set of input intent maps associated with a user input received from a user, at step 302. The received user input, for example, may include, but is not limited to a query to execute an action, a request to process through, or a simple action-oriented command. The user may provide the user input using a computing device, which, for example, may be one of a mobile phone, a computer, a PDA, an assistant, and other similar devices. The set of input intent maps may be generated based on a first subset of words extracted from the user input. By way of an example, the user input may be "call the front desk." Based on the subset of words extracted from the user input, the set of input intent maps may be generated. The generated exemplary set of input intent maps may be represented as:

["call","frontdesk"], ["connect","frontdesk"]

The first subset of words may be processed through at least one of a plurality of intent map transforming algorithms to generate the set of input intent maps. The plurality of intent map transforming algorithms may include a refinement mechanism, a synonym mechanism, a consolidation mechanism, and a reduction mechanism. The set of input intent maps may be one of a set of partial input intent maps and a set of complete input intent maps. The partial input intent maps may be incomplete intent maps and may be progressively generated and updated by iteratively processing the first subset of words through each of the plurality of intent map transforming algorithms in either a sequential manner or a parallel manner while being processed synchronously or asynchronously. In continuation of the above-mentioned example, the set of partial input intent maps may be generated by iteratively processing the first subset of words "call" and "front desk" through each of the refinement mechanism, the synonym mechanism, the consolidation mechanism, and the reduction mechanism. Thus, the generated set of partial input intent maps may, for example, be represented as:

[["call","frontdesk","require"], ["connect","frontdesk", "require"], ["call","frontdesk","question"], ["connect", "frontdesk","question"], ["frontdesk","question","require"], ["call","frontdesk"], ["frontdesk","require"], ["connect","frontdesk"], ["frontdesk","question"], ["frontdesk"]]

Further, the set of complete input intent maps may refer to fully processed and populated partial input intent maps and may be generated upon completion of the iterative processing of the first subset of words. Alternatively, the first subset of words may be processed by all of the plurality of intent map transforming algorithms in one go to generate the set of complete input intent maps. In an embodiment, the set of input intent maps may correspond to a node network that includes a plurality of nodes. Each of the plurality of nodes is a vector representation of the at least one of the first subset of words.

At step 304, each of the set of input intent maps may be matched with each of a plurality of pre-stored sets of intent maps. It may be noted that each of the plurality of pre-stored sets of intent maps may be generated from a single pre-defined training input. The single predefined training input may include a predefined input command. By way of an example, the predefined training input may be "connect me to the frontdesk". Each of the plurality of pre-stored sets of intent maps may further be mapped to a predefined intent, for example, "connect" or "reach' or "direct" and so forth and to a predetermined response, for example, "connecting" or "calling" and the like.

With reference to the above-mentioned example, the word "connect" from the predefined training input may be used to generate the following alternatives in order to train the NLP model: "call", "require", "join", "find", "connection", "get", "need", and "refer." In a similar manner, the word "front desk" from the predefined training input may be used to generate the following alternatives in order to train the NLP model: "require frontdesk", "frontdesk", "front desk", "front", "concierge", and "bell captain".

Using the above, pre-stored sets of intent maps may be generated for the predefined training input: "connect me to the frontdesk." The pre-stored sets of intent maps(hereinafter referred as exemplary representation of the pre-stored sets of intent maps) may be represented as:

["frontdesk","require","call"], ["frontdesk","require", "connect"], ["question","frontdesk","call"], ["frontdesk","call"], ["question","frontdesk","connect"], ["frontdesk","require"], ["frontdesk","connect"], ["question","frontdesk"], ["question","frontdesk","require"], ["frontdesk"], ["frontdesk","require","call"], ["frontdesk","require","connect"], ["question","frontdesk","call"], ["frontdesk","call"], ["question","frontdesk","connect"], ["frontdesk","require"], ["frontdesk","connect"], ["question","frontdesk"], ["question","frontdesk","require"], ["frontdesk"], ["frontdesk","require","call"], ["frontdesk","require", "connect"], ["question","frontdesk","call"], ["frontdesk","call"], ["question","frontdesk","connect"], ["frontdesk","require"], ["frontdesk","connect"], ["frontdesk","require","call"], ["frontdesk","require", "connect"], ["question","frontdesk","call"], ["frontdesk","call"]]

In continuation of the above-mentioned example, each of the set of partial intent maps from the aforementioned exemplary representation of the set of partial intent maps may be matched with each of the pre-stored sets of intent maps from the aforementioned exemplary representation of the pre-stored sets of intent maps.

Referring back to step 304, in an embodiment, the matching may be at least one of a hard level match, a soft level match, a plural level match, and a tense level match. As mentioned above, the set of input intent maps may correspond to a node network that includes a plurality of nodes. The hard level match may include a complete match of the node network with one of the plurality of pre-stored sets of intent maps. The soft level match may include a partial match of the node network with at least one of the plurality of pre-stored sets of intent maps. The plural level match may include matching of the node network with at least one of the plurality of pre-stored sets of intent maps and may include matching plural representation of each of the plurality of nodes. The tense level match may include matching of the node network with at least one of the plurality of pre-stored sets of intent maps and may include matching tense representation of each of the plurality of nodes. This is further explained in detail in conjunction with FIG. 4.

At step 306, a distance of each of the set of input intent maps relative to each of the plurality of pre-stored sets of intent maps may be determined. The distance may correspond to a level of accuracy of match of each of the set of input intent maps with each of the plurality of pre-stored sets of intent maps. As may be appreciated, higher the level of accuracy of the match, the lower may be the distance and vice-versa. Referring back to the above-mentioned example, the distance of each of the set of input intent maps relative to each of the pre-stored set of intent maps may be determined. The set of input intent maps and the pre-stored set of intent maps are again represented below for convenience:

Set of Input Intent Maps:
["call","frontdesk","require"],["connect","frontdesk", "require"],["call","frontdesk","question"], ["connect", "frontdesk","question"]

Pre-Stored Sets of Intent Maps:
["frontdesk","require","call"], ["frontdesk","require", "connect"], ["question","frontdesk","call"], ["frontdesk","call"], ["question","frontdesk","connect"], ["frontdesk","require"], ["frontdesk","connect"], ["question","frontdesk"], ["question","frontdesk","require"], ["frontdesk"], ["frontdesk","require","call"], ["frontdesk","require","connect"], ["question","frontdesk","call"], ["frontdesk","call"], ["question","frontdesk","connect"], ["frontdesk","require"], ["frontdesk","connect"], ["question","frontdesk"], ["question","frontdesk","require"], ["frontdesk"], ["frontdesk","require","call"], ["frontdesk","require", "connect"], ["question","frontdesk","call"], ["frontdesk","call"], ["question","frontdesk","connect"], ["frontdesk","require"], ["frontdesk","connect"], ["frontdesk","require","call"], ["frontdesk","require", "connect"], ["question","frontdesk","call"], ["frontdesk","call"]]

As may be appreciated, the above mentioned pre-stored sets of input intent maps have been presented for a single input sentence, and the multiple other pre-stored sets of input intent maps may be used for matching. Further, the matching may be based on a least determined distance between the set of input intent maps and the pre-stored set of input intent maps.

The process 300, at step 308, may identify a pre-stored intent map from the plurality of pre-stored sets of intent maps that is closest to the to the set of input intent maps. Referring back to the above-mentioned example, from the above depicted plurality of pre-stored sets, the pre-stored intent map: ["connect","frontdesk","require"], may have the least distance to each of the set of input intent maps. As a result, the pre-stored intent map: ["connect","frontdesk", "require"], may be identified.

Further, at step 310, the predetermined response mapped to the pre-stored intent map may be rendered to the user as a reply to the received user input. In continuation of the above-mentioned example, the pre-stored intent map: ["connect","frontdesk","require"] may be mapped to a predetermined response of "calling." Thus, in response to the user command of "call the front desk," the response "calling" and action to call the front desk may be rendered to the user.

Referring now to FIG. 4, an exemplary process for matching each of a set of input intent maps with each of a plurality of pre-stored sets of intent maps is illustrated, in accordance with some embodiments. In an embodiment, the set of input intent maps may correspond to a node network that includes a plurality of nodes. Each of the plurality of nodes may be a vector representation of one of a first subset of words determined from a user input. By way of an example, for the set of input intent maps given below, the corresponding plurality of nodes may be, vector representations of "call", "frontdesk", "question", "require", "connect":

["call","frontdesk","require"], ["connect","frontdesk", "require"], ["call","frontdesk","question"], ["connect", "frontdesk","question"]

The step 304 of matching each of a set of input intent maps with each of a plurality of pre-stored sets of intent maps may include steps 402-408. Based on a user selection, each of the step 402-408 may be executed in combination or completely independent of each other. At step 402, a hard level matching for each of the set of input intent maps with each of the plurality of pre-stored sets of intent maps may be performed. The hard level match may include performing a complete match (i.e. an absolute match) of the node network with one of the plurality of pre-stored sets of intent maps. In continuation of the above-mentioned example, when the input intent map is ["connect","frontdesk","require"], the hard level matching would be successful when one of the plurality of pre-stored sets of intent maps is also represented as ["connect","frontdesk","require"]. However, if none of the pre-stored sets of intent maps are found having representations matching completely to the input intent map ["connect","frontdesk","require"], the hard level matching may be considered to be un-successful.

At step 404, a soft level matching for each of the set of input intent maps may be performed. The soft level match may include conducting a partial match of the node network with at least one of the plurality of pre-stored sets of intent maps. In continuation of the above-mentioned example, the set of input intent maps may include, for example, the input intent map ["connect","frontdesk","require"]. For the soft level matching to be successful at least one of the plurality of pre-stored sets of intent maps should match partially to the input intent map ["connect","frontdesk","require"]. This implies that if the pre-stored set of intent maps include any of the following: ["call","frontdesk","question"], ["connect-","frontdesk","question"], the soft level matching may be successful as there is a partial match between the input intent map ["connect","frontdesk","require"] the pre-stored intent map ["call","frontdesk","question"]. However, if none of the pre-stored sets of intent maps are found to even partially match to the input intent map ["connect","frontdesk","require"], the soft level matching may be considered to be un-successful.

Further, the soft level matching may be performed for a dialogue-based conversation where the set of input intent maps is not complete and the soft level matching may be required to fill in missing information. For example, if the set of input intent maps for the dialogue-based conversation is ["have", "a", "question", "about", "the", "restaurant"], then by using the elastic stretching process the set of input intent maps may be partially matched to the pre-stored set of intent map, for example ["question", "hotel"]. This pre-stored intent map may use the soft level matching to generate an additional set of input intent maps, for example, ["Can", "I", "connect", "you", "to", "the," "front desk", "room service" or "house keeping"].

At step 406, a plural level matching for each of the set of input intent maps may be performed. In the plural level match a plural representation of each of the plurality of nodes of the node network may be considered for matching. In continuation of the above-mentioned example, the input intent map ["connect","frontdesk","require"] may be considered for ease of explanation. In order to performing the plural level match, the input intent map ["connect","frontdesk","require"] and its plural representation, for example, ["connects", "front desks", "requires"] may also be matched with each of the plurality of pre-stored sets of intent maps.

At step 408, a tense level matching for each of the set of input intent maps may be performed. In the tense level match, various tense representations of each of the plurality of nodes of the node network may be considered while preforming the step of matching. By way of an example and for ease of explanation, a single input intent map ["where", "is" "bar","location"] is considered. For performing the tense level match for this input intent map, each of the following pre-stored intent maps may also be identified as a match ["where","will be" "bar","location"] and ["where", "was","bar","location"].

As may be appreciated, the soft level matching, at step 404 may include and may be applied for a verb form, a tense form and a plural form, and a gender form of the set of input intent maps. In an embodiment, use of the hard level matching or the soft level matching may be determined by the user (or by the API) and may be selected or deselected for use accordingly. Typically, the soft level match may be a default mode of the matching, and hence the hard level match may be activated by the user as and when required. In an embodiment, the plural level match and the tense level match for the set of input intent maps may be performed when the user has selected the soft level match. In an embodiment, each of the soft level match, the hard level match, the plural level match, and the tense level match may be performed for the processed user input (for example, sentences, words, and phrases) generated through the STT mechanism. Further, the soft level match may be used by application developers, language teachers or trainers to indicate on which sentence or word of the user input the soft level match may be applied. This may hence direct the user to a correct word, a correct structure, phrase or sentence.

Figure 5:
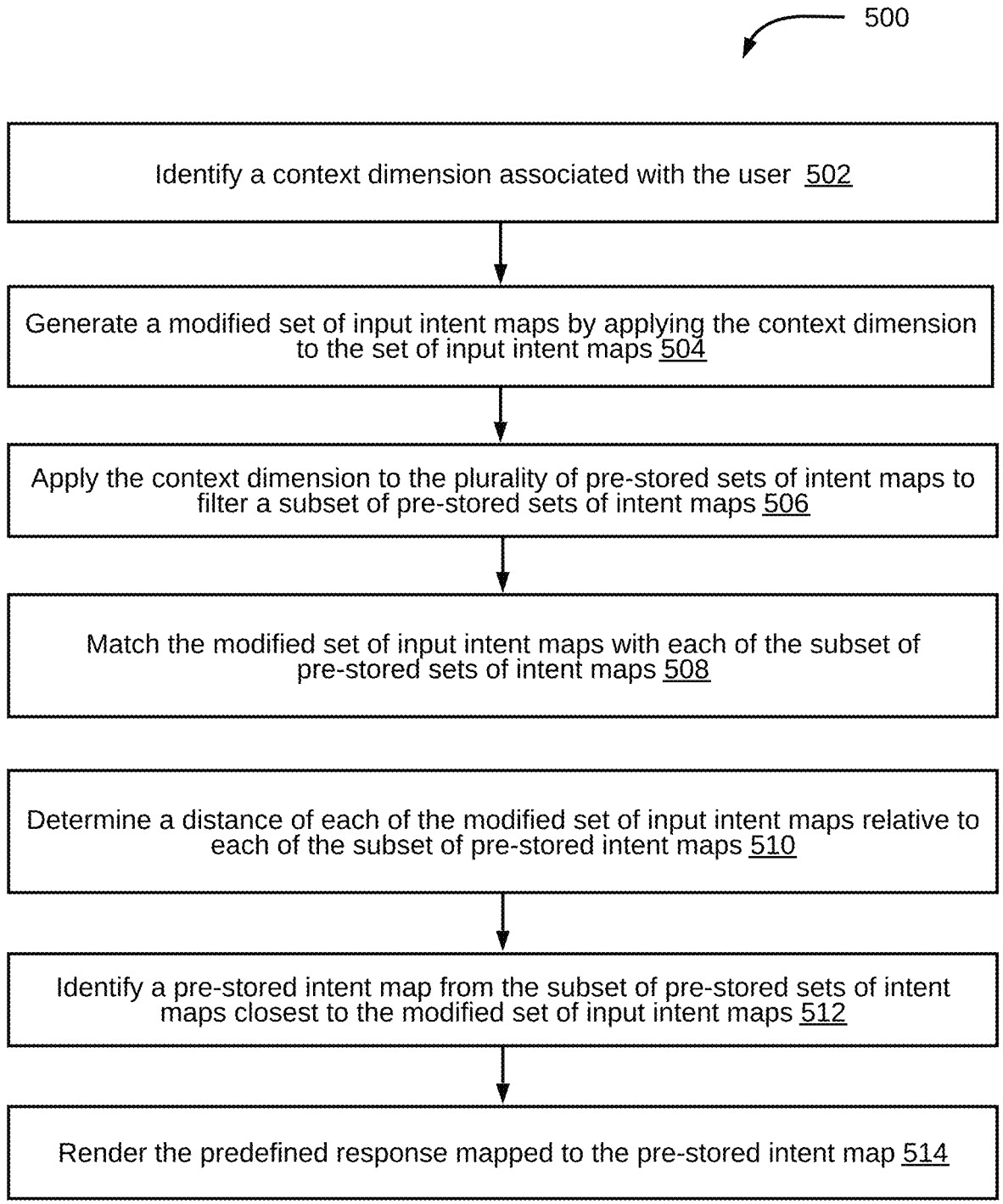
FIG. 5 illustrates an exemplary process for processing a user input based on a context dimension associated with a user using NLP, in accordance with some embodiments.

Referring now to FIG. 5, an exemplary process 500 for processing a user input based on a context dimension associated with a user is depicted via a flowchart, in accordance with some embodiments. The process 500, at step 502, may identify a context dimension associated with the user. By way of an example, the context dimension may be a current state of the user, such as, "exercise-mode". Additionally or alternatively, the current state associated with the user may be determined from the user input. At step 504, the identified context dimension may be applied to the set of input intent maps to generate a modified set of input intent maps. In continuation of the example above, the identified context dimension "exercises-mode" may be applied to generate a modified set of input intent maps such as, for example, ["select", "exercise", "request"], ["select 1", "exercise 1", "request"], ["select 1", "exercise 1", "ask"], ["select 1", "exercise 1", "request", "level"], ["select 1 and 2", "exercise 1", "exercise 2", "request", "level"], ["select", "1 pm"] and the like. It may be noted that "exercise" is an addition made to the existing set of input intent maps.

The process 500, at step 506 may apply the context dimension to the plurality of pre-stored sets of intent maps in order to filter and obtain a subset of pre-stored sets of intent maps. The subset of pre-stored sets of intent maps may further be sorted in a descending order of relevance based on the context dimension. With respect to the above-mentioned example, when the context dimension, for example, "exercises-mode" is applied, the subset of pre-stored sets of intent maps may be represented as:

["select", "exercise", "request"], ["select 1", "exercise 1", "request"], ["select 1", "exercise 1", "ask"], ["select 1", "exercise 1", "request", "level"], ["select 1 and 2", "exercise 1", "exercise 2", "request", "level"], ["select", "1 pm"], ["select 1", "channel", "change"], ["select 2", "channel", "state-change"], ["select 1 and 2", channel 1 and channel 2", "ask", "state-change"].

Further, the process 500, at step 508 may match the modified set of input intent maps with each of the subset of pre-stored sets of intent maps. In continuation of the example given above, the modified set of input intent maps as depicted above may be matched to each of the subset of pre-stored sets of intent maps as depicted above.

At step 510, a distance of each of the modified set of input intent maps relative to each of the subset of pre-stored sets of intent maps may be determined. As may be appreciated, the distance may be inversely proportional to a degree of relevance. This implies, that the higher the distance, the lower is the degree of relevance and vice versa.

At step 512, a pre-stored intent map from the subset of pre-stored sets of intent maps that is closest to the modified set of input intent maps may be identified. In continuation of the example given above, the pre-stored intent map, for example, ["select", "exercise", "request"] may be identified as being closest to the modified set of input intent maps.

At step 514, the predetermined response mapped to the pre-stored intent map may be rendered to the user. Referring back to the above-mentioned example, the predetermined response "selecting exercise" may be mapped to the pre-stored intent map and may thus be rendered to the user.

As may be appreciated, based on the context selected, the modified set of input intent map "select 1" may be mapped to the subset of pre-stored sets of intent maps to either select the "exercise 1" or if the user was entering a time in a calendar to "select 1 pm". This implies that based on the context selected, the matched pre-stored sets of intent maps be determined. In addition, the context may be applied to the user input that has been processed using a STT mechanism. By way of an example, when the modified set of input intent maps is, for example, ["select","won"], and upon applying the STT mechanism one or more alternatives of the word, for example, "won", such as "1" or "one" are generated. Thus, for determination of the matching in terms of the context of a leaderboard, the pre-stored set of intent maps ["select", "won"] may be a best match.

Figure 6:
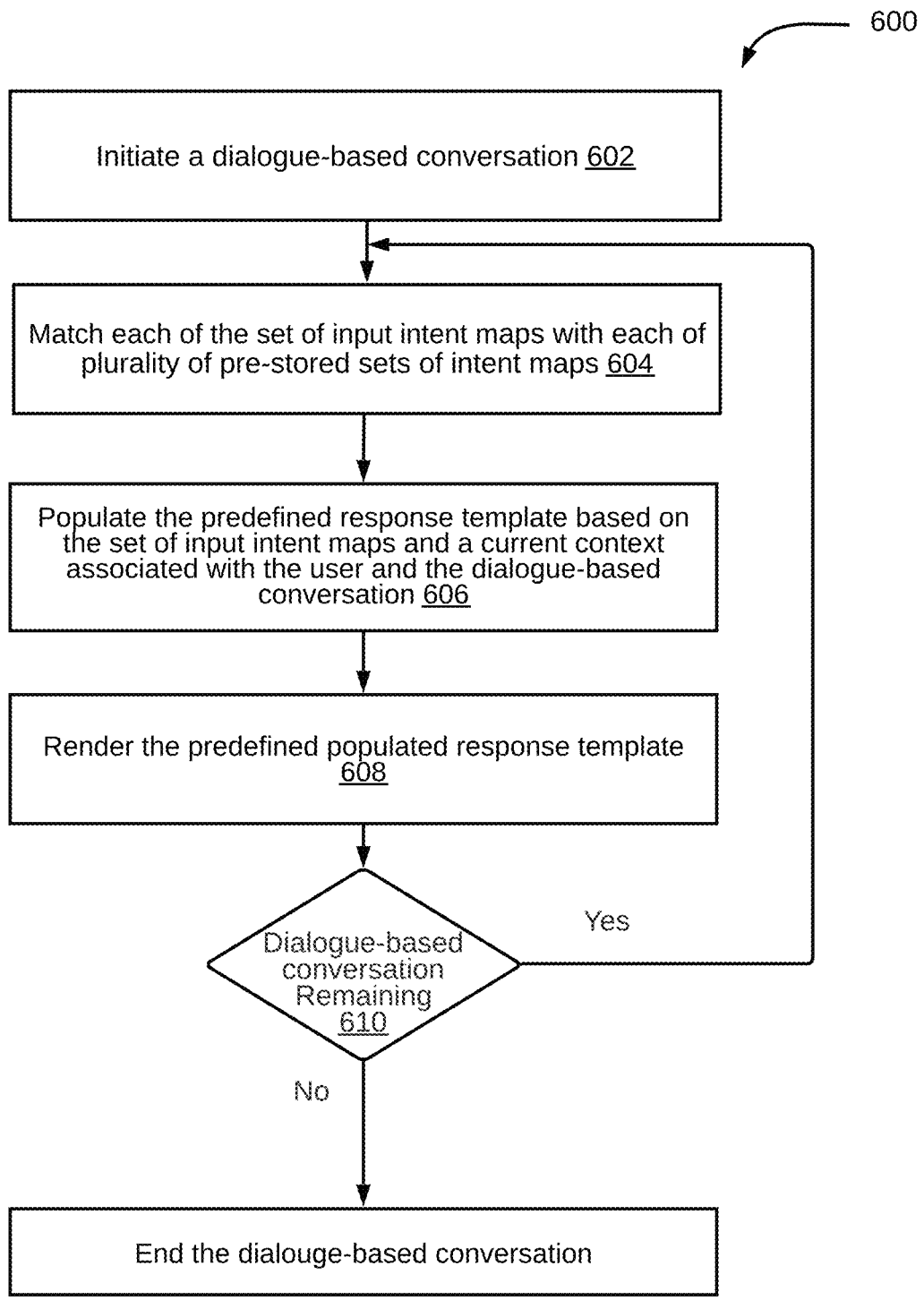
FIG. 6 illustrates an exemplary process for processing a user input in a dialogue-based conversation using NLP, in accordance with some embodiments.

Referring now to FIG. 6, an exemplary process 600 for processing a user input in a dialogue-based conversation is depicted via a flowchart, in accordance with some embodiments. At step 602, a dialogue-based conversation may be initiated by a user. On the dialogue-based conversation being initiated, matching of each of the set of input intent maps with each of plurality of pre-stored sets of intent maps may be performed, at step 604. In this embodiment, each of the plurality of pre-stored sets of intent maps may be generated from a single predetermined training dialogue. Further, each of the plurality of pre-stored sets of intent maps may be mapped to a predetermined response template.

Once a pre-stored intent map is identified in response to the matching, at step 606, a predetermined response template mapped to the pre-stored intent map may be populated based on the set of input intent maps and a current context associated with the user and the dialogue-based conversation. After being populated, the predetermined response template may be rendered to the user at step 608. Further, at step 610, a check may be performed to determine whether any further conversation within the dialogue-based conversation is pending. If yes, the control passes to step 604, else the dialogue-based conversation is closed. It may be apparent that as part of the dialogue-based conversation, the matching of each of the set of input intent maps and subsequent rendering of the predetermined response mapped to the pre-stored sets of intent maps may be performed iteratively while any of the dialogue-based conversation is pending.

By way of an example and in accordance with the steps described above for the process 600, a dialogue-based conversation may be initiated by a user called Jack with a chatbot associated with a fitness website that implements the current invention. Upon the dialogue-based conversation being initiated, an appropriate predetermined response template may be rendered by the chatbot to "Jack" based on the current ongoing dialogue. As explained above, the template may be populated based on a current context associated with Jack and the initiated dialogue-based conversation. When Jack initiated the dialogue-based conversation, the chatbot may display "Hello Jack! Great to see you back! Are you ready to get fit?" to Jack in the chat window. Jack may respond by saying "I want to workout." In response, the predetermined response template: "select one of cardio exercises, pilates exercises, strength training exercises" may be rendered to Jack. Jack may further respond by saying "strength training." In response, the predetermined response template: "select one of arms, legs, shoulders, back, or chest. Jack may further respond by saying select legs and in response the chatbot may render the predetermined response template: "strength training for legs is being started". Alternatively, for the dialogue-based conversation "Are you ready to get fit", the predetermined response template may be: "yes, strength training for my legs". As may be appreciated, for the above discussed dialogue-based conversation, an entire dialogue-based conversation has been addressed and answered by one of a set of initial input intent maps.

Figure 7:
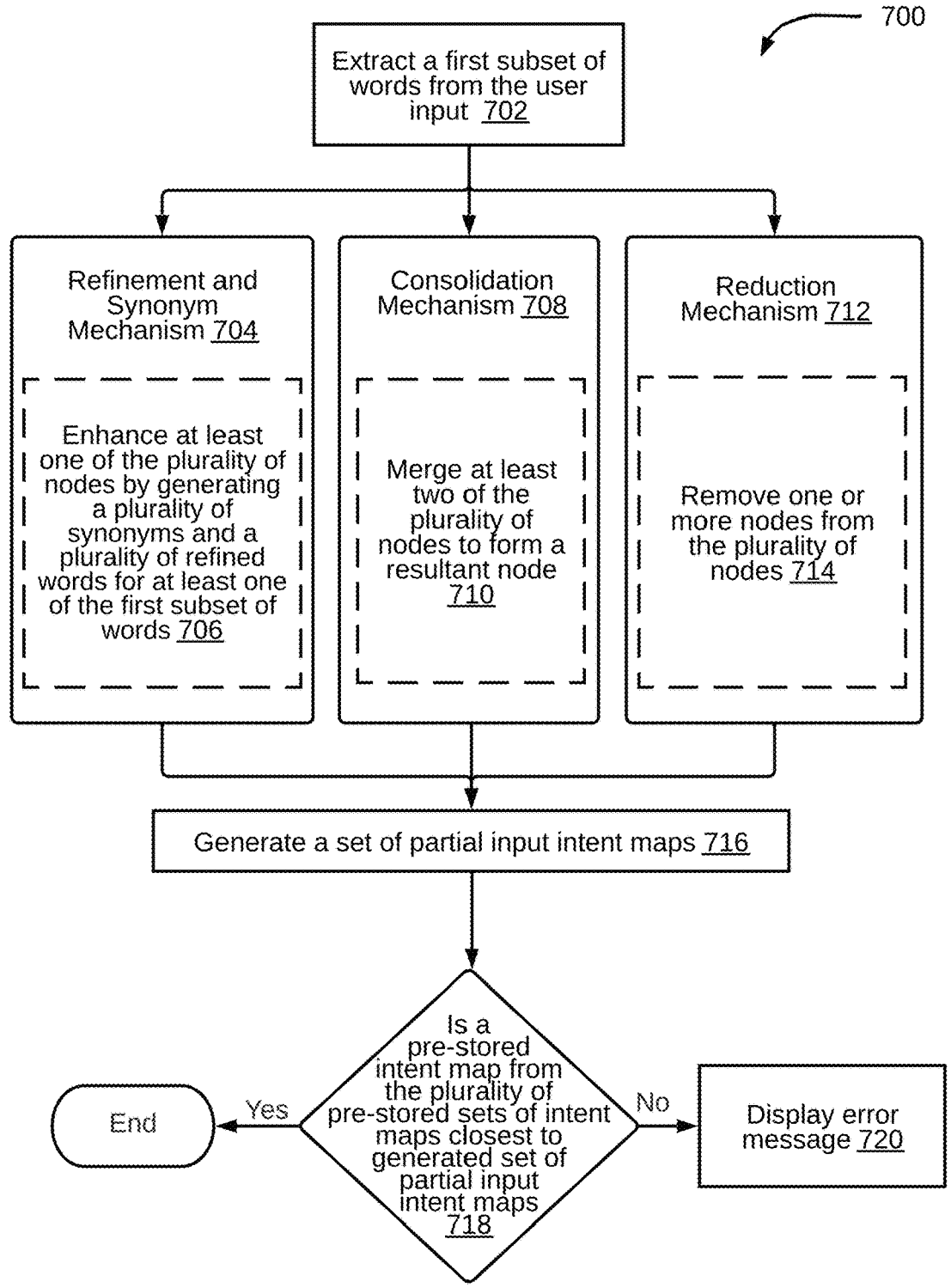
FIG. 7 illustrates an exemplary process for determining a pre-stored intent map from a plurality of pre-stored sets of intent maps, in accordance with some embodiments.

Referring now to FIG. 7, an exemplary process 700 for determining a pre-stored intent map from a plurality of pre-stored sets of intent maps is depicted via a flowchart, in accordance with some embodiments. With respect to the exemplary process 700, a set of input intent maps may correspond to a node network that includes a plurality of nodes. Each of the plurality of nodes may be a vector representation of one of a first subset of words received from a user input. The process 700, at step 702, may extract a first subset words from the user input. By way on an example, the user input may be "I want to know how do I get to the Tokyo Tower" and the extracted first subset of words from the user input may be "how", "get to", and "Tokyo Tower". The extracted first subset of words may be processed through each of a plurality of intent map transforming algorithms. The intent map transforming algorithms may include a refinement mechanism, a consolidation mechanism, a synonym mechanism, and a reduction mechanism.

In this embodiment, the first subset of words, at step 704, may be processed through the refinement and the synonym mechanism. The refinement and synonym mechanism may include enhancing, at step 706, at least one of the plurality of nodes. The at least one of the plurality of nodes may be enhanced by generating a plurality of synonyms and a plurality of refined words for at least one of the first subset of words. Further, the refinement and synonym mechanism may include a transformation mechanism where one of the plurality of nodes may be replaced by an alternative node. The alternative node may include words that have a changed form than those received from the user input. After execution of the refinement and the synonym mechanism, a set of refined partial input intent maps may be generated at step 716. In continuation of the above-mentioned example, after execution of the refinement mechanism and the synonym mechanism at step 704, the generated set of refined partial input intent maps may be represented as:

[["want","tokyo","question","tower","require","direction"], ["require","want","tokyo","direction","tower"] question-direction→direction
["want","tokyo","direction","question","tower"],→["tokyo","direction","question","tower"]]

Further, at step 708, the first subset of words may be fed processed through the consolidation mechanism. The consolidation mechanism may include merging, at step 710, at least two of the plurality of nodes to form a resultant node. Further, the resultant node may be used generate a set of consolidated partial input intent maps, at step 716. In continuation of the above-mentioned example, the set of consolidated partial input intent maps may be represented as:

["location-Tokyo-tower"], ["want-know-question-direction-Tokyo-tower"], ["know-question-direction-Tokyo-Tower"], ["direction-Tokyo-tower"]

Further, at step 710, the first subset of words may be processed through the reduction mechanism. The reduction mechanism may include removing, at step 714, one or more nodes from the plurality of nodes. Based on removal of the one or more nodes, a set of reduced partial input intent maps may be generated at step 716. In continuation of the above-mentioned example, the set of reduced partial input intent maps may be represented as:

["tokyo","question","tower","require","direction"]

In a current iteration, the process 700, at step 718, may determine if a pre-stored intent map from the plurality of pre-stored sets of intent maps is closest to the generated set of partial input intent maps. Upon determination of the pre-stored intent map, the process 700 may be halted. However, if the closest pre-stored intent map from the plurality of pre-stored sets of intent maps is not found, an error message is returned and displayed at step 720.

As may be appreciated, execution of the refinement mechanism and synonym mechanism at step 704, the consolidation mechanism at step 708, and the reduction mechanism at step 712 have been illustrated to be executing in parallel However, these steps may be executed in a sequential manner. In an embodiment, a priority and an order of execution may be associated with each of the intent map transforming algorithms. Alternatively, no such priority and order of execution may be there and each of the intent map transforming algorithms may be executed in a random fashion. Thus, when the set of refined partial input intent maps are generated at step 716 after execution of step 704, the step 718 may be performed. In case a pre-stored intent map closest to the set of refined partial input intent maps is not found, the set of refined partial input intent maps may be fed back as input to the step 708. Similarly, the partial input intent map generated from the execution of the consolidation mechanism at step 708, may be set as input to the step 712, in case a pre-stored intent map closest to the set of reduced partial input intent maps is not found. In an embodiment, an iteration of the process 700 that requires a minimum number of executions of the refinement mechanism and synonym mechanism, the consolidation mechanism, and the reduction mechanism may be chosen to locate the closest match.

Figure 8:
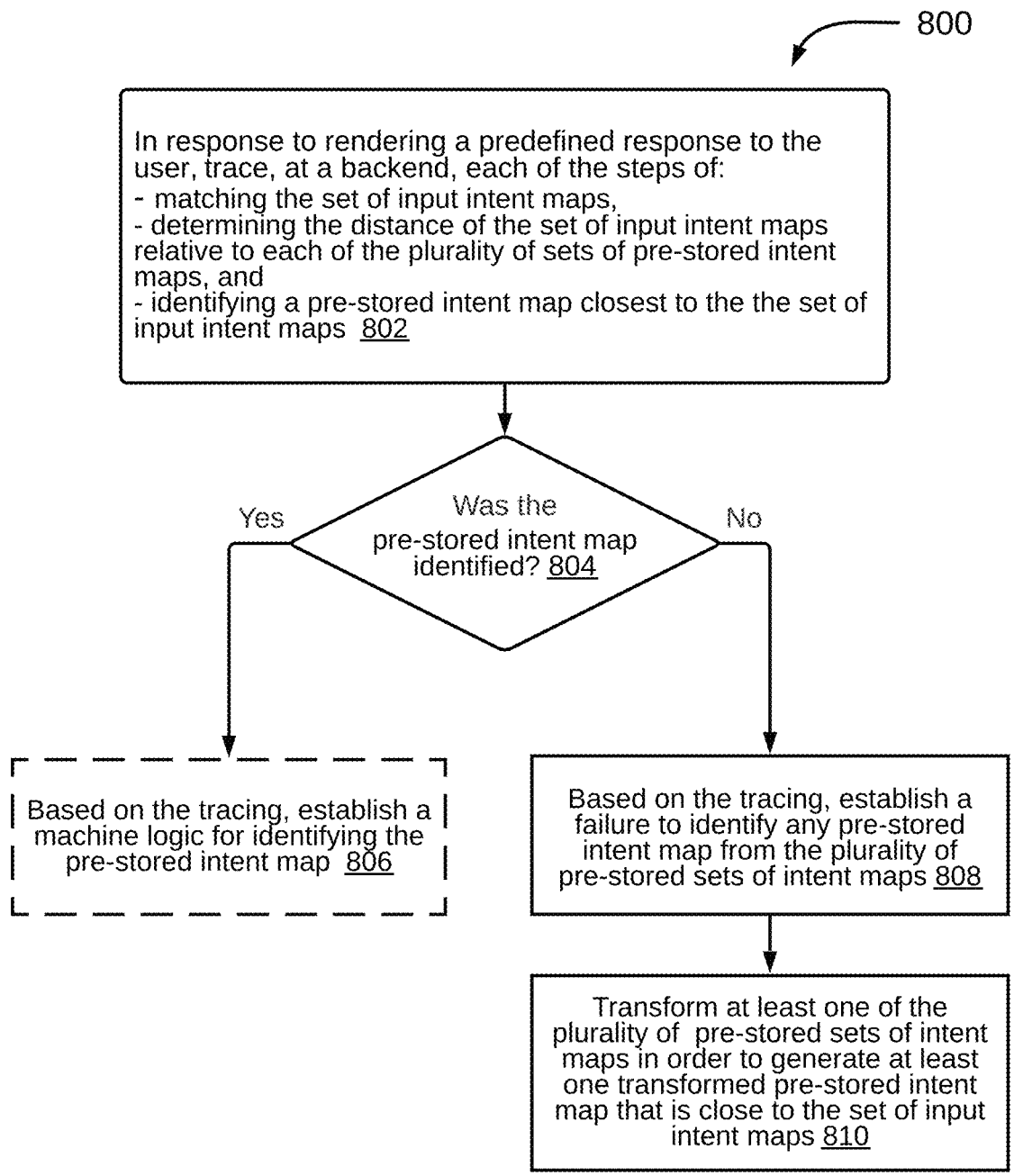
FIG. 8 illustrates an exemplary process for tracing each of steps of matching a set of input intent maps with a plurality of pre-stored sets of intent maps and subsequently transforming at least one of the plurality of pre-stored sets of intent maps, in accordance with some embodiments.
Figure 9A:
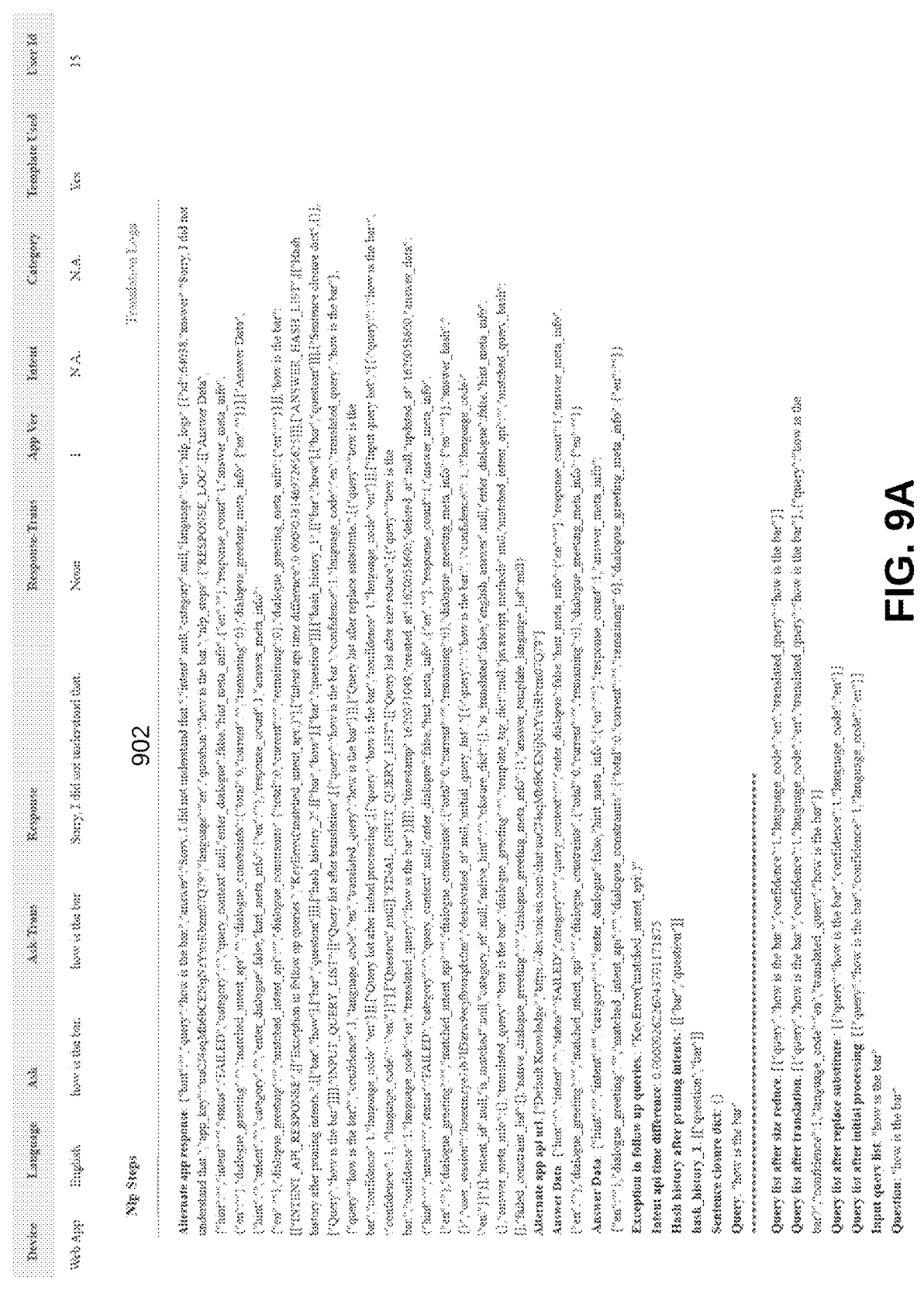
Figure 9B:
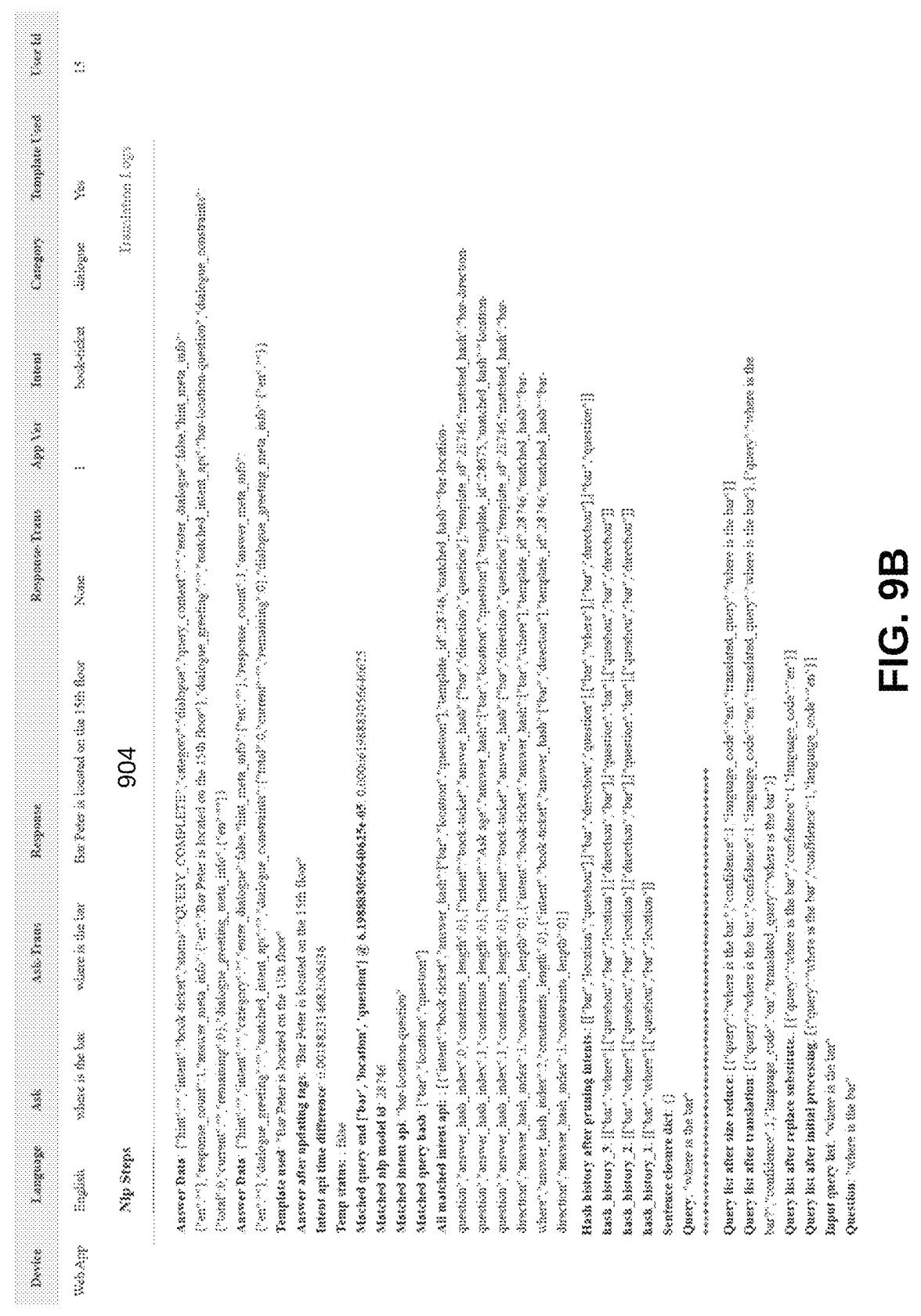

With reference to FIG. 8, an exemplary process 800 for tracing each of steps of matching a set of input intent maps with a plurality of pre-stored sets of intent maps and subsequently transforming at least one of the plurality of pre-stored sets of intent maps, in accordance with some embodiments. In response to rendering a predetermined response to a user, the process 800, at step 802, may trace, at a backend, each of the steps of matching a set of input intent maps, determining the distance of the set of input intent maps relative to each of the plurality of sets of pre-stored input intent maps, and identifying a pre-stored intent map closest to the set of input intent maps. The process 800, at step 804, may perform a check to determine whether a pre-stored intent map closest to the set of input intent maps is identified or not. If the pre-stored intent map closest to the set of input intent maps is identified, at step 806, based on the tracing, a machine logic for identifying the pre-stored intent map may be established. This is represented in FIG. 9B, where identification of a pre-stored intent map from the plurality of pre-stored sets of intent maps having a close distance with the set of input intent maps was successful. As shown, for the query "where is the bar" a successful response has been received "Bar Peter is located on the $15^{th}$ floor". The reason for the success of the generated query may also be established by analyzing NLP steps 904.

Referring back to step 804, if the pre-stored intent map closest to the set of input intent maps is not identified, the process 800, at step 810, may establish a failure to identify the pre-stored intent map from the plurality of pre-stored sets of intent maps having a close distance with the set of input intent maps. This is represented in FIG. 9A, where a failure is encountered while identifying the pre-stored intent map from the plurality of pre-stored sets of intent maps having close distance with the set of input intent maps. As shown, for the query "how is the bar" a failure response has been received "Sorry, I did not understand that". The reason for failure of the generated query may also be established by analyzing NLP steps 902. In an embodiment, on establishing the failure, the at least one of the plurality of pre-stored sets of intent maps may be transformed, at step 810, in order to generate at least one of transformed pre-stored intent map that is close to the set of input intent maps.

As will be also appreciated, the above-described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Thus, the disclosed method and system tries to overcome the problem of understanding intent, purpose, requests and sentence parts from user inputs using NLP, especially for sentence parts of poorly-structured and poorly-worded texts.

Having said that, the present invention allows for both the processing of well-constructed and well-worded texts as well as poorly-constructed and poorly-worded texts. The method and system may include constructing an intent map from the user inputs using a small training data set. The intent map may include at least a desire, a question, a location information, a verb form, a noun form, a tense form, and a plural form of the user input. The disclosed method and system may provide a better understanding of the intent, the purpose, and the sentence parts of poorly-structured and poorly-worded texts from the user input. The disclosed system and method may provide a set of intent maps for known intents that may be pre-calculated along with derived intents. The derived intents may be obtained using intent map transforming algorithms (for example, an elastic and iterative process) that may include at least one of a refinement mechanism, a consolidation mechanism, a synonym mechanism, and a reduction mechanism. The derived intents may be indexed and cached for matching an intent determined from the user input and may thus improve performance of matching process. The disclosed system and method may provide a better understanding of the intent from the user input through machine translation. Further, the disclosed system and method may enable providing a better understanding and identification of intent of non-native speakers and of speakers using varied dialects and having multiple language variations.

As will be appreciated by those skilled in the art, the techniques described in the various embodiments discussed above are not routine, or conventional, or well understood in the art. The techniques discussed above may provide generating, by an NLP model, a set of input intent maps associated with a user input received from a user based on a first subset of words extracted from the user input. Generating the set of input intent maps may comprise processing the first subset of words through at least one of a plurality of intent map transforming algorithms. The set of input intent maps may be one of a set of partial input intent maps and a set of complete input intent maps. The technique may match each of the set of input intent maps with each of a plurality of pre-stored sets of intent maps. Each of the plurality of pre-stored sets of intent maps may be generated from a single predefined training input and may be mapped to a predefined intent and a predetermined response. The single predefined training input may comprise a predefined input command. The technique may determine a distance of each of the set of input intent maps relative to each of the plurality of pre-stored sets of intent maps. The technique may identify a pre-stored intent map from the plurality of pre-stored sets of intent maps closest to the set of input intent maps. The technique may render the predetermined response mapped to the pre-stored sets of intent maps to the user.

In light of the above-mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described method and system for processing user input using Natural Language Processing (NLP). The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for processing user input using Natural Language Processing (NLP), the method comprising:
    generating, by an NLP model, a set of input intent maps associated with a user input received from a user based on a first subset of words extracted from the user input, wherein generating the set of input intent maps comprises processing the first subset of words through at least one of a plurality of intent map transforming algorithms, and wherein the set of input intent maps is one of a set of partial input intent maps and a set of complete input intent maps;
    matching each of the set of input intent maps with each of a plurality of pre-stored sets of intent maps, wherein each of the plurality of pre-stored sets of intent maps is generated from a single predefined training input and is mapped to a predefined intent and a predetermined response, and wherein the single predefined training input comprises a predefined input command, wherein matching the set of input intent maps comprises:
        at each sequential iteration of generating the set of partial input intent maps, matching each of the set of partial input intent maps with each of the plurality of pre-stored sets of intent maps until the pre-stored intent map from the plurality of pre-stored sets of intent maps that is closest to the generated set of partial input intent maps is identified in a current iteration;
    determining a distance of each of the set of input intent maps relative to each of the plurality of pre-stored sets of intent maps;
    identifying a pre-stored intent map from the plurality of pre-stored sets of intent maps closest to the set of input intent maps; and
    rendering, to the user, the predetermined response mapped to the pre-stored sets of intent maps.

2. The method of claim 1, further comprising:
identifying a context dimension associated with the user;
applying the context dimension to the set of input intent maps to generate a modified set of input intent maps; and
  applying the context dimension to the plurality of pre-stored sets of intent maps to filter a subset of pre-stored sets of intent maps, wherein the subset of pre-stored sets of intent maps are sorted in a descending order of relevance based on the context dimension.

3. The method of claim 2, further comprises:
matching the modified set of input intent maps with each of the subset of pre-stored sets of intent maps;
determining a distance of each of the modified set of input intent maps relative to each of the subset of pre-stored sets of intent maps;
identifying a pre-stored intent map from the subset of pre-stored sets of intent maps closest to the modified set of input intent maps; and
rendering, to the user, the predetermined response and intent mapped to the pre-stored intent map.

4. The method of claim 1, wherein the set of input intent maps corresponds to a node network comprising a plurality of nodes, wherein each of the plurality of nodes is a vector representation of one of the first subset of words, and wherein matching each of the set of input intent maps further comprises performing at least one of:
  a hard level match, wherein the hard level match comprises a complete match of the node network with one of the plurality of pre-stored sets of intent maps;
  a soft level match, wherein the soft level match comprises a partial match of the node network with at least one of the plurality of pre-stored sets of intent maps;
  a plural level match, wherein in the plural level match, matching of the node network with at least one of the plurality of pre-stored sets of intent maps includes matching plural representation of each of the plurality of nodes; and
  a tense level match, wherein in the tense level match, matching of the node network with at least one of the plurality of pre-stored sets of intent maps includes matching tense representation of each of the plurality of nodes.

5. The method of claim 1, wherein matching each of the set of input intent maps and subsequently rendering of the predetermined response mapped to the pre-stored sets of intent maps is performed iteratively as part of a dialogue-based conversation, and
wherein in the dialogue-based conversation each of the plurality of pre-stored sets of intent maps is generated from a single predetermined training dialogue and is mapped to a predetermined response template, and
wherein before being rendered, the predetermined response template is populated based on the set of input intent maps and a current context associated with the user and the dialogue-based conversation.

6. The method of claim 1, wherein when the set of input intent maps is the set of partial input intent maps, generating the set of input intent maps comprises:
iteratively processing the first subset of words through each of the plurality of intent map transforming algorithms in at least a sequential manner or a parallel manner to generate the set of partial input intent maps.

7. The method of claim 1, wherein the plurality of intent map transforming algorithms comprises at least one of a refinement mechanism, a consolidation mechanism, a synonym mechanism, and a reduction mechanism, and
wherein the set of input intent maps corresponds to a node network comprising a plurality of nodes, wherein each of the plurality of nodes is a vector representation of one of the first subset of words.

8. The method of claim 7, wherein the refinement mechanism and the synonym mechanism comprise:
enhancing at least one of the plurality of nodes by generating a plurality of synonyms and a plurality of refined words for at least one of the first subset of words; and generating a set of refined partial input intent maps based on the enhanced at least one of the plurality of nodes.

9. The method of claim 7, wherein the consolidation mechanism comprises:
merging at least two of the plurality of nodes to form a resultant node; and
using the resultant node to generate a set of consolidated partial input intent maps.

10. The method of claim 7, wherein the reduction mechanism comprises:
removing one or more nodes from the plurality of nodes; and
generating a set of reduced partial input intent maps based on removal of the one or more nodes.

11. The method of claim 1, wherein the user input is at least one of a textual input and a verbal input.

12. The method of claim 11, further comprising:
converting the verbal input to a plurality of textual outputs using a Speech-to-Text (STT) mechanism,
wherein a set of input intent maps is generated for each of the plurality of textual outputs, and
wherein a confidence score is associated with each of the plurality of textual outputs, wherein the confidence score corresponds to accuracy of the converting the verbal input into the associated textual output based on a predetermined STT training set.

13. A system for processing user input using Natural Language Processing (NLP), the system comprising:
a processor; and
a memory communicatively coupled to the processor, wherein the memory stores processor-executable instructions, which, on execution, causes the processor to:
  generate, by an NLP model, a set of input intent maps associated with a user input received from a user based on a first subset of words extracted from the user input, wherein generating the set of input intent maps comprises processing the first subset of words through at least one of a plurality of intent map transforming algorithms, and wherein the set of input intent maps is one of a set of partial input intent maps and a set of complete input intent maps;
  match each of the set of input intent maps with each of a plurality of pre-stored sets of intent maps, wherein each of the plurality of pre-stored sets of intent maps is generated from a single predefined training input and is mapped to a predefined intent and a predetermined response, and wherein the single predefined training input comprises a predefined input command, wherein matching the set of input intent maps comprises:
    at each sequential iteration of generating the set of partial input intent maps, matching each of the set of partial input intent maps with each of the plurality of pre-stored sets of intent maps until the pre-stored intent map from the plurality of pre-stored sets of intent maps that is closest to the generated set of partial input intent maps is identified in a current iteration;

determine a distance of each of the set of input intent maps relative to each of the plurality of pre-stored sets of intent maps;

identify a pre-stored intent map from the plurality of pre-stored sets of intent maps closest to the set of input intent maps; and render, to the user, the predetermined response mapped to the pre-stored sets of intent maps.

14. The system of claim 13, wherein the processor-executable instructions further cause the processor to:

identify a context dimension associated with the user;

apply the context dimension to the set of input intent maps to generate a modified set of input intent maps; and apply the context dimension to the plurality of pre-stored sets of intent maps to filter a subset of pre-stored sets of intent maps, wherein the subset of pre-stored sets of intent maps are sorted in a descending order of relevance based on the context dimension.

15. The system of claim 14, wherein the processor-executable instructions further cause the processor to:

match the modified set of input intent maps with each of the subset of pre-stored sets of intent maps;

determine a distance of each of the modified set of input intent maps relative to each of the subset of pre-stored sets of intent maps;

identify a pre-stored intent map from the subset of pre-stored sets of intent maps closest to the modified set of input intent maps; and render, to the user, the predetermined response and intent mapped to the pre-stored intent map.

16. The system of claim 13, wherein the set of input intent maps corresponds to a node network comprising a plurality of nodes, wherein each of the plurality of nodes is a vector representation of one of the first subset of words, and wherein matching each of the set of input intent maps further comprises performing at least one of:

a hard level match, wherein the hard level match comprises a complete match of the node network with one of the plurality of pre-stored sets of intent maps;

a soft level match, wherein the soft level match comprises a partial match of the node network with at least one of the plurality of pre-stored sets of intent maps;

a plural level match, wherein in the plural level match, matching of the node network with at least one of the plurality of pre-stored sets of intent maps includes matching plural representation of each of the plurality of nodes; and a tense level match, wherein in the tense level match, matching of the node network with at least one of the plurality of pre-stored sets of intent maps includes matching tense representation of each of the plurality of nodes.

17. The system of claim 13, wherein to match each of the set of input intent maps and to subsequently render the predetermined response mapped to the pre-stored sets of intent maps is performed iteratively as part of a dialogue-based conversation, and wherein in the dialogue-based conversation each of the plurality of pre-stored sets of intent maps is generated from a single predetermined training dialogue and is mapped to a predetermined response template, and wherein before being rendered, the predetermined response template is populated based on the set of input intent maps and a current context associated with the user and the dialogue-based conversation.

18. The system of claim 13, wherein when the set of input intent maps is the set of partial input intent maps, generating the set of input intent maps comprises:

iteratively processing the first subset of words through each of the plurality of intent map transforming algorithms in at least a sequential manner or a parallel manner to generate the set of partial input intent maps.

19. A computer program product being embodied in a non-transitory computer readable storage medium of a computing device and comprising computer instructions for:

generating, by an NLP model, a set of input intent maps associated with a user input received from a user based on a first subset of words extracted from the user input, wherein generating the set of input intent maps comprises processing the first subset of words through at least one of a plurality of intent map transforming algorithms, and wherein the set of input intent maps is one of a set of partial input intent maps and a set of complete input intent maps;

matching each of the set of input intent maps with each of a plurality of pre-stored sets of intent maps, wherein each of the plurality of pre-stored sets of intent maps is generated from a single predefined training input and is mapped to a predefined intent and a predetermined response, and wherein the single predefined training input comprises a predefined input command, wherein matching the set of input intent maps comprises:

at each sequential iteration of generating the set of partial input intent maps, matching each of the set of partial input intent maps with each of the plurality of pre-stored sets of intent maps until the pre-stored intent map from the plurality of pre-stored sets of intent maps that is closest to the generated set of partial input intent maps is identified in a current iteration;

determining a distance of each of the set of input intent maps relative to each of the plurality of pre-stored sets of intent maps;

identifying a pre-stored intent map from the plurality of pre-stored sets of intent maps closest to the set of input intent maps; and rendering, to the user, the predetermined response mapped to the pre-stored sets of intent maps.

* * * * *